United States Patent
Angold et al.

(10) Patent No.: US 9,604,369 B2
(45) Date of Patent: Mar. 28, 2017

(54) EXOSKELETON AND METHOD OF INCREASING THE FLEXIBILITY OF AN EXOSKELETON HIP JOINT

(71) Applicant: Ekso Bionics, Inc., Richmond, CA (US)

(72) Inventors: Russdon Angold, American Canyon, CA (US); Nicholas Fleming, San Francisco, CA (US)

(73) Assignee: Ekso Bionics, Inc., Richmond, CA (US)

( * ) Notice: Subject to any disclaimer, the term of this patent is extended or adjusted under 35 U.S.C. 154(b) by 0 days.

(21) Appl. No.: 15/023,851

(22) PCT Filed: Jun. 1, 2015

(86) PCT No.: PCT/US2015/033540
§ 371 (c)(1),
(2) Date: Mar. 22, 2016

(87) PCT Pub. No.: WO2015/195310
PCT Pub. Date: Dec. 23, 2015

(65) Prior Publication Data
US 2016/0229065 A1    Aug. 11, 2016

Related U.S. Application Data

(60) Provisional application No. 62/007,511, filed on Jun. 4, 2014.

(51) Int. Cl.
*A45F 3/04* (2006.01)
*B25J 17/00* (2006.01)
(Continued)

(52) U.S. Cl.
CPC ............ *B25J 17/00* (2013.01); *A61H 1/0237* (2013.01); *A61H 1/0244* (2013.01); *A61H 3/00* (2013.01);
(Continued)

(58) Field of Classification Search
CPC .. B25J 9/0006; A61H 3/00; A45F 5/02; A45F 5/021; A45F 3/04; A45F 3/047
(Continued)

(56) References Cited

U.S. PATENT DOCUMENTS

| 4,574,790 A | 3/1986 | Wellershaus |
| 4,964,628 A | 10/1990 | Poplawski |

(Continued)

FOREIGN PATENT DOCUMENTS

| GB | 2278041 | 11/1994 |
| JP | 2009207840 | 9/2009 |
| WO | WO 2011/127421 | 10/2011 |

*Primary Examiner* — Justin Larson
*Assistant Examiner* — Lester L Vanterpool
(74) *Attorney, Agent, or Firm* — Diedericks & Whitelaw, PLC (57) ABSTRACT

An exoskeleton comprises a torso brace, configured to be coupled to a torso of a user, and a leg support, configured to be coupled to a leg of the user. A plurality of links couples the torso brace to the leg support. The plurality of links includes a first link, coupled to the torso brace at a first pivot point, and a second link, coupled to the leg support at a second pivot point. The first link is coupled to the second link through a third pivot point located between the first and second pivot points. The first pivot point enables adduction of the leg support, and the third pivot point enables abduction of the leg support.

20 Claims, 4 Drawing Sheets

(51) Int. Cl.
  *B25J 9/00* (2006.01)
  *A61H 1/02* (2006.01)
  *A61H 3/00* (2006.01)

(52) U.S. Cl.
  CPC ..... *B25J 9/0006* (2013.01); *A61H 2001/0248* (2013.01); *A61H 2201/149* (2013.01); *A61H 2201/164* (2013.01); *A61H 2201/165* (2013.01); *A61H 2201/1619* (2013.01); *A61H 2201/1628* (2013.01); *A61H 2201/1676* (2013.01)

(58) Field of Classification Search
  USPC .................................................. 224/272, 637
  See application file for complete search history.

(56) References Cited

U.S. PATENT DOCUMENTS

| | | | |
|---|---|---|---|
| 5,320,590 | A | 6/1994 | Poplawski |
| 7,571,839 | B2 | 8/2009 | Chu et al. |
| 7,854,715 | B2 | 12/2010 | Ashihara |
| 7,883,546 | B2 | 2/2011 | Kazerooni et al. |
| 7,947,004 | B2 | 5/2011 | Kazerooni et al. |
| 8,070,700 | B2 | 12/2011 | Kazerooni et al. |
| 8,784,344 | B2 | 7/2014 | Takahashi et al. |
| 8,801,641 | B2 | 8/2014 | Kazerooni et al. |
| 8,968,222 | B2 * | 3/2015 | Kazerooni ............. B25J 9/0006 224/265 |
| 2005/0258210 | A1 * | 11/2005 | Chu ......................... A45F 3/08 224/637 |
| 2007/0056592 | A1 * | 3/2007 | Angold .................... A61H 3/00 128/845 |
| 2007/0123997 | A1 * | 5/2007 | Herr ......................... A61F 2/60 623/27 |
| 2008/0009771 | A1 | 1/2008 | Perry et al. |
| 2008/0294080 | A1 | 11/2008 | Adarraga |
| 2009/0292369 | A1 * | 11/2009 | Kazerooni ............... A61H 3/00 623/27 |
| 2010/0094185 | A1 * | 4/2010 | Amundson ........... A61F 5/0102 602/16 |
| 2011/0040216 | A1 | 2/2011 | Herr et al. |
| 2011/0105966 | A1 * | 5/2011 | Kazerooni ............. A61H 3/008 601/35 |
| 2011/0264014 | A1 * | 10/2011 | Angold .................... B66D 3/18 601/35 |
| 2011/0266323 | A1 * | 11/2011 | Kazerooni ............. B25J 9/0006 224/575 |
| 2012/0156661 | A1 * | 6/2012 | Smith .................... G09B 9/003 434/219 |
| 2012/0259259 | A1 | 10/2012 | Chugunov |
| 2012/0292361 | A1 * | 11/2012 | Thiruppathi ............. A45F 3/08 224/576 |
| 2013/0226048 | A1 | 8/2013 | Unluhisarcikli et al. |
| 2013/0303950 | A1 * | 11/2013 | Angold ................. B25J 9/0006 601/35 |
| 2014/0121573 | A1 | 5/2014 | Kazerooni et al. |

* cited by examiner

EXOSKELETON AND METHOD OF INCREASING THE FLEXIBILITY OF AN EXOSKELETON HIP JOINT

CROSS REFERENCE TO RELATED APPLICATIONS

This application represents a National Stage application of PCT/US2015/033540 entitled "Exoskeleton and Method of Increasing the Flexibility of an Exoskeleton Hip Joint" filed Jun. 1, 2015, which claims the benefit of U.S. Provisional Patent Application Ser. No. 62/007,511, which was filed on Jun. 4, 2014 and titled "Collocated Exoskeleton Hip Abduction Joints". The entire content of these applications are incorporated by reference.

GOVERNMENT LICENSE RIGHTS

This invention was made with government support under Contract H92222-14-9-0001 awarded by the United States Special Operations Command. The government has certain rights in the invention.

FIELD OF THE OF THE INVENTION

The present invention relates to a device and method that augments a user's carrying capacity and strength, increasing performance and aiding in the prevention of injury during the execution of certain load-bearing or strength-requiring tasks. More particularly, the present invention relates to a device suitable for use by a person engaging in weight-bearing tasks, the device comprising a set of artificial limbs and related control systems that potentiate improved function of the user's appendages including, but not limited to, greater strength and endurance in the user's legs, allowing for more weight to be carried by the user while walking.

BACKGROUND OF THE INVENTION

Wearable exoskeletons have been designed for medical, commercial and military applications. Medical exoskeletons are designed to help restore a user's mobility. Commercial and military exoskeletons help prevent injury and augment a user's stamina and strength by alleviating loads supported by workers or soldiers during strenuous activities. Exoskeletons designed for use by able-bodied users often act to improve the user's stamina by transferring the weight of a tool or load through the exoskeleton structure and to the ground, thus decreasing the weight borne by the user. For the exoskeleton to transfer this weight to the ground, each exoskeleton support member and exoskeleton joint between the exoskeleton weight and the ground must be able to act as a conduit of this force around the user. This requires a degree of rigidity, seen in the joints of current exoskeletons, that can limit the range of motion of some exoskeleton joints. By limiting the flexibility at these joints, the mobility and maneuverability of the exoskeleton is reduced, thereby limiting the usefulness of the exoskeleton in certain applications.

Supporting the structure of an exoskeleton through a hip joint while maintaining a high degree of hip joint flexibility is one of the more difficult exoskeleton design challenges. In order to transfer weight effectively at the hip joint, many current exoskeleton designs utilize a hip joint with limited flexibility, particularly with respect to hip abduction and adduction. The flexibility of the hip of some exoskeleton designs is improved by adding an array of joints and movable members that extend away from the hip joint of the exoskeleton user. Such designs, in which the exoskeleton structure extends substantially away from the body of the exoskeleton user, result in a high level of relative movement between the exoskeleton legs and hips and the legs and hips of the user during some leg and hip movements. Differences in relative movement are undesirable for a number of reasons: they make exoskeleton movements less like the human movements that are intuitive to the exoskeleton user; and, importantly, they can result in translational movements at the legs that cause chafing between the user and the exoskeleton. Preventing this translational movement requires additional exoskeleton design features to allow the exoskeleton legs to extend or compress in order to maintain the same length as the user's legs. In addition, the added bulk of hip joints that extend away from the user can decrease exoskeleton maneuverability in tight spaces, increase exoskeleton weight and interfere with the motion of the exoskeleton user's arms.

Due to the limitations imposed on exoskeleton use by the restricted range of motion in exoskeleton hip joints, there exists a need in the art to develop a device that allows improved flexibility in weight-bearing exoskeleton hip joints. There exists a further need to develop joints in which the relative movement between the exoskeleton and the exoskeleton user is minimized and to develop joints that do not substantially increasing the bulk of the exoskeleton at the hip joints.

SUMMARY OF THE INVENTION

Disclosed herein are devices and methods that allow for greatly improved flexibility in weight-bearing exoskeleton hip joints. The exoskeleton hip joints are collocated with the hip joints of a user, thus keeping the structural pieces closely fit to the body of the user and forming more biomechanically equivalent exoskeleton hip joints. This results in decreased relative movement between the exoskeleton and user.

In particular, the present invention is directed to an exoskeleton comprising a torso brace, configured to be coupled to a torso of a user, and a leg support, configured to be coupled to a leg of the user. A plurality of links couples the torso brace to the leg support. The plurality of links includes a first link, coupled to the torso brace at a first pivot point, and a second link, coupled to the leg support at a second pivot point. The first link is coupled to the second link through a third pivot point located between the first and second pivot points. The first pivot point enables adduction of the leg support, and the third pivot point enables abduction of the leg support. The exoskeleton is configured to transfer at least a portion of the weight of a load from the torso brace, through the plurality of links and to the leg support.

In one embodiment, an axis of rotation of the third pivot point is generally perpendicular to both an axis of rotation of the second pivot point and a coronal plane of the exoskeleton. An axis of rotation of the first pivot point is generally parallel to the axis of rotation of the third pivot point.

In another embodiment, the second link is directly coupled to the first link at the third pivot point, or the second link is directly coupled to a third link, of the plurality of links, at the third pivot point. In one embodiment in which the second link is coupled to the third link, the first link is also directly coupled to the third link.

In yet another embodiment, the first and second links are configured to make physical contact during adduction of the leg support, thereby limiting adduction of the leg support. A strap is coupled to the first link, and the strap is configured to limit movement of the first link relative to the torso brace. A second plurality of links couples the torso brace to a second leg support, the second plurality of links including a first link coupled to the torso brace at a first pivot point. The strap couples the first link of the first plurality of links to the first link of the second plurality of links.

Additional objects, features and advantages of the invention will become more readily apparent from the following detailed description of preferred embodiments thereof when taken in conjunction with the drawings wherein like reference numerals refer to common parts in the several views.

DETAILED DESCRIPTION OF THE PREFERRED EMBODIMENTS

Detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to employ the present invention. Additionally, as used in connection with the present invention, terms such as "parallel" and "perpendicular" do not necessarily require, for example, that the relevant items be perfectly parallel. Instead, these terms contemplate a margin of error of +/−5° (regardless of whether the error is by design or due to inherent manufacturing limitations) so long as the error does not prevent the present invention from functioning as intended. The modifier "substantially" increases the margin of error to +/−10°, while the modifier "generally" increases the margin to +/−15°.

In the present invention, exoskeleton hip joint flexibility is improved through the incorporation of at least one additional rotatable member in the coronal plane of the hip joint structure of the exoskeleton (relative to previous designs). This rotatable member is prevented from moving in the adduction direction medial of normal stance. Incorporation of this hip joint device provides for a greater degree of freedom and flexibility in the affected hip joint without compromising the ability of the affected hip joint to bear weight.

The primary embodiment of the present invention comprises an exoskeleton hip joint device with two rotatably connected members that are rotatable in the coronal plane. The rotatable members attach the exoskeleton leg to the exoskeleton torso in such a way as to allow the exoskeleton structure to abduct and adduct the exoskeleton leg. The exoskeleton hip is collocated with and closely fit to the hip of the exoskeleton user, thus forming a more biomechanically equivalent exoskeleton hip joint. The hip joint device also has hard stops restricting movement of these rotatable connected members, particularly to prevent the joint from moving in the adduction direction of the leg upon which the exoskeleton is standing when the exoskeleton is standing on one leg. This is important so as to allow the exoskeleton to transfer the load of the exoskeleton (and any other attached load) through the exoskeleton hip while standing on the corresponding leg.

Figure 1A:
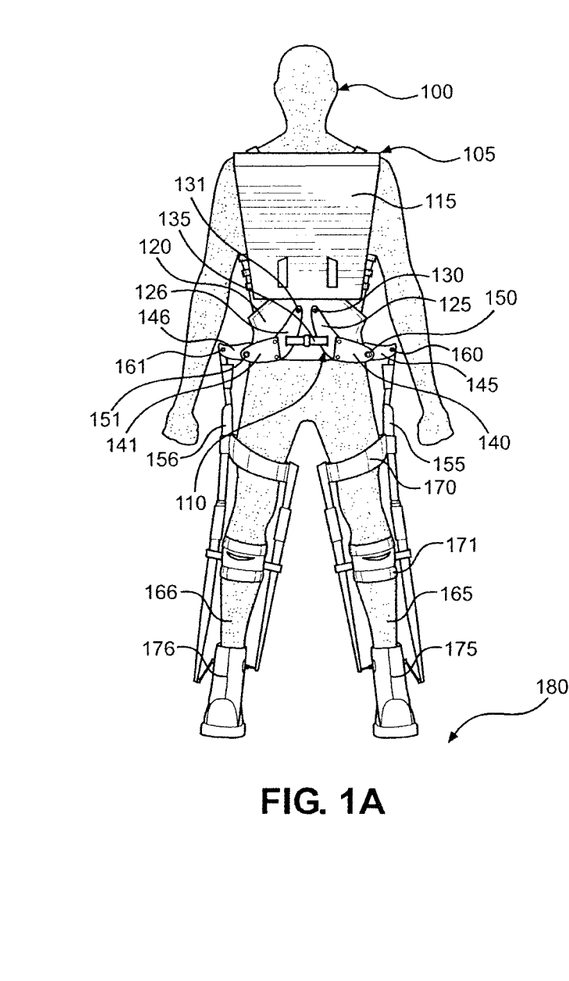
FIG. 1A is a rear view of an exoskeleton constructed in accordance with a primary embodiment of the present invention.
Figure 1B:
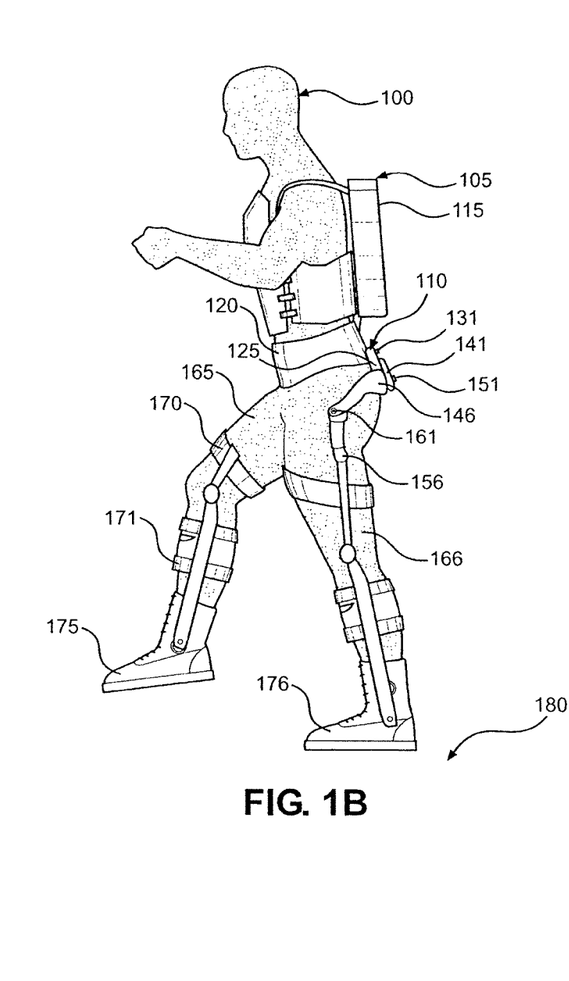
FIG. 1B is a side view of the exoskeleton of the primary embodiment.
Figure 1C:
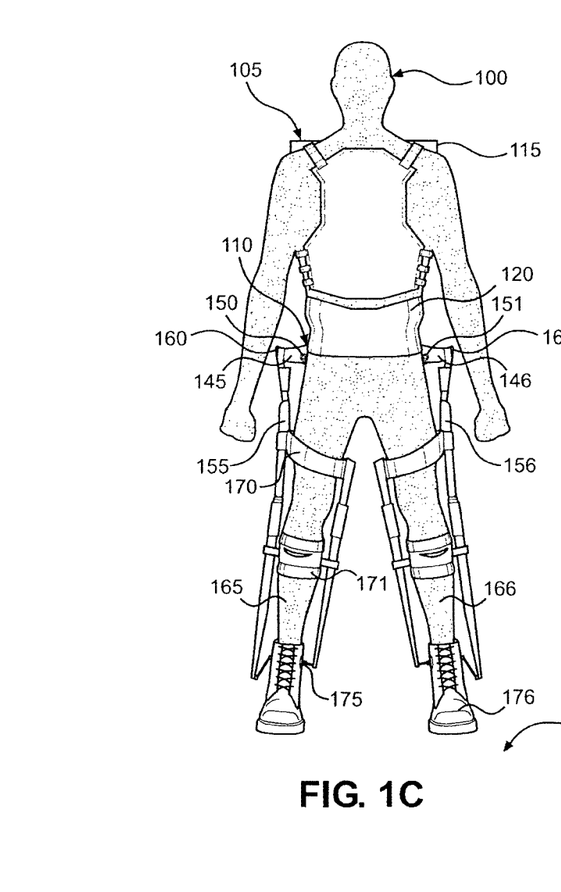
FIG. 1C is a front view of the exoskeleton of the primary embodiment.

With reference to FIGS. 1A-C, a user 100 is shown wearing an exoskeleton 105 having a hip joint 110. Hip joint 110 supports the weight of a rear exoskeleton structure 115, which is connected to a torso brace 120. An upper rotatable link 125 is rotatably connected to torso brace 120 by an upper rotor 130 (at an upper pivot point), which applies spring tension to upper link 125 in the abduction direction relative to torso brace 120. Abduction of upper link 125 is limited by tension applied by an adjustable restraining strap 135, which is connected to an opposing upper rotatable link 126. An extension link 140 is connected to upper link 125, and a lower rotatable link 145 is rotatably connected to extension link 140 by a lower rotor 150 (at a lower pivot point). In some embodiments, extension link 140 and upper link 125 are the same link i.e., integral; similarly, in some embodiments, extension link 141 and upper link 126 are the same link. Lower link 145 is connected to a leg support 155 by a hinge joint 160 (at a leg pivot point), and leg support 155 is coupled to a leg 165 of user 100 by braces 170 and 171 and a boot 175. Leg support 155 is also connected to boot 175, which contacts a surface 180. As a result of the above-described structure, the weight of a load (e.g., rear exoskeleton structure 115 or an object attached thereto) is transferred to surface 180 through torso brace 120, upper link 125, link extension 140, lower link 145, leg support 155 and boot 175. Since the structure of exoskeleton 105 can take various forms, as is known in the art, the portions of exoskeleton 105 unrelated to the present invention will not be detailed further herein.

Figure 2A:
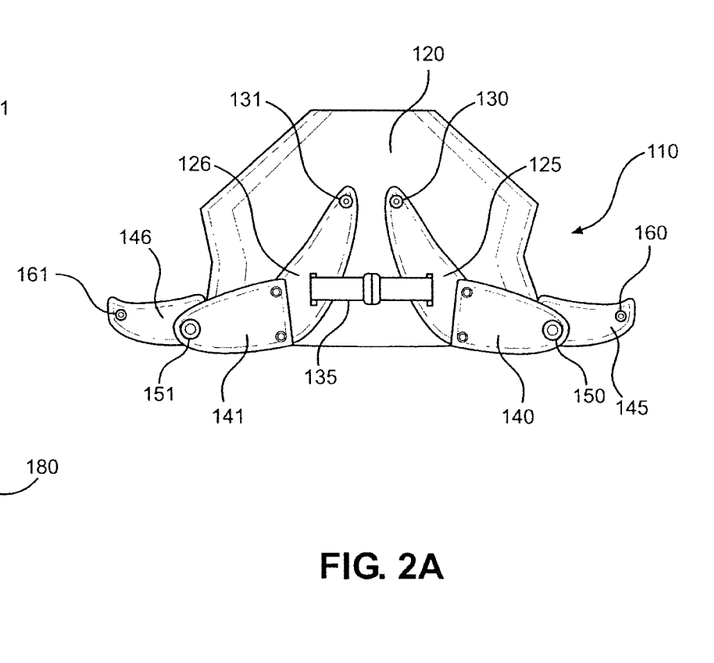
FIG. 2A is a rear view of a hip joint of the primary embodiment in a neutral hip position.

Turning to FIG. 2A, hip joint 110 is shown in the neutral position, i.e., with no adduction or abduction of either leg. As discussed above, upper link 125 is rotatably connected to torso brace 120 by upper rotor 130, which applies spring tension to upper link 125 in the abduction direction. Abduction of upper link 125 is limited by tension applied by strap 135, which is connected to opposing upper link 126. Upper link 126 is connected to torso brace 120 by an opposing upper rotor 131, and upper rotor 131 applies spring tension to upper link 126 in the abduction direction relative to torso brace 120. As a result, strap 135 prevents either of upper rotor 130 or upper rotor 131 from rotating in the abduction direction without a corresponding rotation in the adduction direction by the other rotor (i.e., on the opposite side of hip joint 110). Extension link 140 is connected to the upper link 125, and lower link 145 is rotatably connected to extension link 140 by lower rotor 150. Extension link 140 serves to position upper link 125 and lower link 145 in such a way that adduction of the lower link 145 is limited by a physical clash with upper link 125 in the coronal plane of exoskeleton 105, thus preventing adduction of lower link 145 beyond the position shown in FIG. 2A. Limiting the maximum adduction of lower link 145, and, therefore, limiting the maximum adduction of leg support 155, is important for the exoskeleton being able to bear a load during the stance phase. Without an adduction stop, the moment generated by the load bearing on torso brace 120 would need to be supported by user 100, thereby making user 100 bear the vertical weight of the load as well and rendering exoskeleton 105 incapable of bearing the load as intended. By designing upper link 125, extension link 140 and lower link 145 so that adduction about lower rotor 150 is stopped at an adduction angle that is typical during walking, exoskeleton 105 will bear the moment and then the load as well.

Figure 2B:
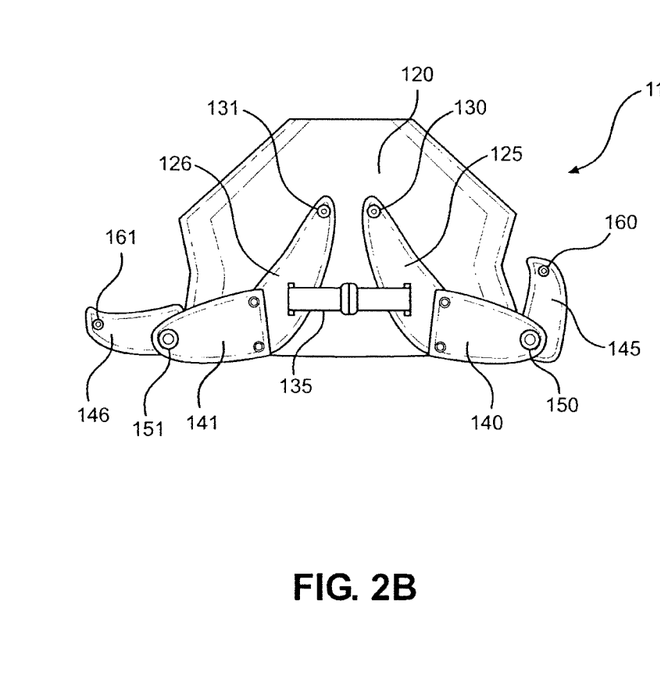
FIG. 2B is a rear view of the hip joint of the primary embodiment and demonstrates movement of a right hip in maximum abduction while a left hip is in the neutral position.

FIG. 2B shows hip joint 110 with the left leg in the neutral position and the right leg in abduction. Lower link 145 is shown rotating about lower rotor 150 and abducting relative to torso brace 120. The maximum abduction of lower link 145, which extends behind the plane of this drawing as shown in FIG. 1B, is limited by contact with torso brace 120. It should be noted that the abduction of leg support 155 of exoskeleton 105 occurs only through rotation of lower link 145 about lower rotor 150 and without rotation by either of upper rotor 130 or upper rotor 131, which allows abduction of leg support 155 while exoskeleton 105 is standing on an opposing leg support 156.

Figure 2C:
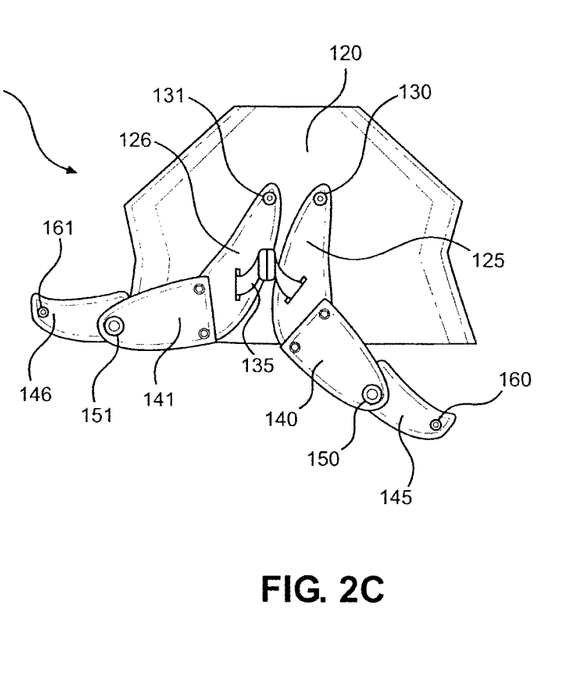
FIG. 2C is a rear view of the hip joint of the primary embodiment and demonstrates movement of the right hip in maximum adduction while the left hip is in the neutral position.

FIG. 2C shows hip joint 100 with the left leg in the neutral position and the right leg in adduction. As discussed above, upper rotor 130 applies spring tension to upper link 125 in the abduction direction. In FIG. 2C, the spring force of upper rotor 130 is overcome by force from user 100 or exoskeleton 105 in order to move the right leg in adduction. Specifically, upper link 125 is moved in the adduction direction about upper rotor 130. During adduction, strap 135 becomes slack as upper link 125 draws nearer to upper link 126. Continued adduction of upper link 125 is restrained by physical contact with upper link 126. As both upper link 125 and upper link 126 move in the same plane, physical clashing limits maximal relative adduction for upper links 125 and 126. It should be noted that the adduction of leg support 155 of exoskeleton 105 occurs only through rotation of upper link 125 about upper rotor 130 and without rotation by either lower rotor 150 or upper rotor 131, which allows adduction of leg support 155 while exoskeleton 105 is standing on leg support 156.

Figure 3A:
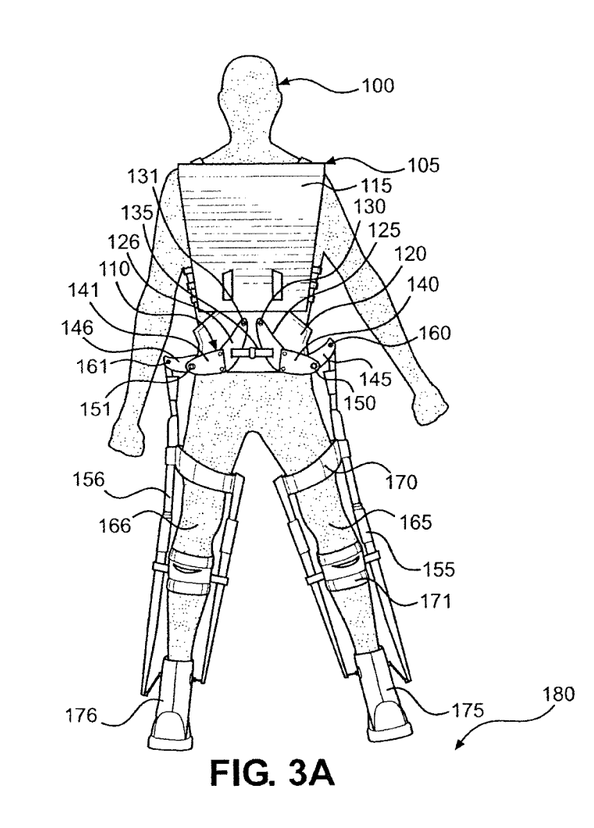
FIG. 3A is a rear view of the exoskeleton of the primary embodiment and demonstrates abduction at a hip joint of a user's right leg.

With reference now to FIG. 3A, lower link 145 is shown rotated in the coronal plane about lower rotor 150 in the abduction direction. As lower link 145 is connected to leg support 155 by hinge joint 160, leg support 155 is abducted to the same extent as lower link 145 in terms of angle change in the coronal plane. Since leg support 155 and leg 165 are no longer in contact with surface 180, hip joint 110 bears the weight of exoskeleton 105 and transfers this weight to leg support 156 (coupled to an opposing leg 166), which ultimately transfers the weight of exoskeleton 105 to an opposing boot 176 and surface 180.

Figure 3B:
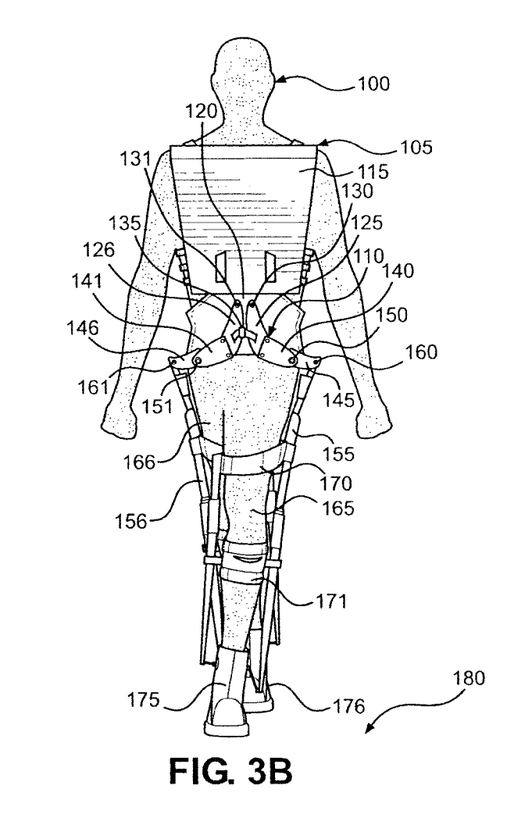
FIG. 3B is a rear view of the exoskeleton of the primary embodiment and demonstrates adduction at hip joints of both of the user's legs.

FIG. 3B shows upper links 125 and 126 rotated in the adduction direction about upper rotors 130 and 131, respectively. Strap 135 is slack and applies no significant force to upper links 125 and 126. Leg supports 155 and 156 are adducted to the same angle in the coronal plane as upper links 125 and 126, respectively. This adduction results in a crossing of legs 165 and 166, while leg supports 155 and 156, which are connected to boots 175 and 176, transmit the weight of exoskeleton 105 to surface 180. It should be noted that lower link 145 and an opposing lower link 146 do not rotate about lower rotor 150 and an opposing lower rotor 151 during adduction of leg supports 155 and 156 because the hard stops (described above in connection with FIGS. 2A and 2C) prevent such adduction motion.

Based on the figures and the above discussion, it can be seen that the axes of rotation of rotors 150, 151 are at least generally perpendicular to: 1) the axes of rotation of rotors 160, 161; and 2) the coronal plane of exoskeleton 105. Additionally, the axes of rotation of rotors 130, 131 are at least generally parallel to the axes of rotation of rotors 150, 151. Preferably, these axes of rotation are substantially perpendicular or parallel and, more preferably, perpendicular or parallel.

As an example of the primary embodiment, consider a soldier wearing an exoskeleton and navigating through rough terrain. The improved flexibility of the hip joints allows the soldier to select a path with obstacles that would restrict a user wearing a prior art exoskeleton design. For instance, abduction at the hip joint, as shown in FIG. 3A, allows the exoskeleton and soldier to more easily walk along sloped or uneven surfaces. Yet at the same time, the exoskeleton will bear the weight of the exoskeleton and a payload attached to the exoskeleton, thereby providing the parallel load path that is a goal of the exoskeleton. The ability to adduct both legs, as shown in FIG. 3B, even crossing them over while walking or standing, allows the exoskeleton and soldier to walk through more narrow spaces (e.g., between obstacles or over a narrow surface) and also allows the exoskeleton and user to turn more quickly, thereby improving maneuverability in tight spaces.

The exoskeleton of the primary embodiment, due to the improved biomechanical equivalence resulting from collocating the hip structure close to the body of the user, permits abduction with less resistance than the abduction hinge joint disclosed in U.S. Pat. No. 7,947,004 in which the hinge is beside the user's hip. This is because, in the exoskeleton of the primary embodiment, there is no resistance from a spring system designed to take up translation resulting from a non-collocation of the axis of rotation, as in the prior art.

In some embodiments, the exoskeleton has at least one actuated joint. In other embodiments, the exoskeleton joints are not actuated. Optionally, in place of lower rotor 150, a plurality of pivot points can be provided between upper rotor 130 and hinge pivot 160, for example. Also, in some embodiments, there is an additional abduction hinge joint located below the joint of the primary embodiment of the present invention. This additional hinge joint, disclosed in U.S. Pat. No. 7,947,004, which is incorporated herein in its entirety by reference, can work in concert with the joint of the primary embodiment to improve the flexibility of an exoskeleton hip in the coronal plane, specifically by allowing for abduction of a leg when the leg is under flexion. In other embodiments, additional joints are combined with the joint of the primary embodiment of the present invention (either alone or in combination with the hinge joint disclosed in U.S. Pat. No. 7,947,004). These additional joints include members that allow for rotation of the leg and one or more compression-elongation mechanisms, which allow for lengthening of the leg structure relative to the hip and knee joints. The compression-elongation mechanisms are used to take up translation resulting from non-collocation of the axis of rotation caused by abduction at the hinge joint, as disclosed in U.S. Pat. No. 7,947,004. These rotational joints and compression-elongation mechanisms are also disclosed in U.S. Pat. No. 7,947,004.

Based on the above, it should be readily apparent that the present invention provides a device and method that enables improved flexibility in weight-bearing exoskeleton hip joints. Although described with reference to preferred embodiments, it should be readily understood that various changes or modifications could be made to the invention without departing from the spirit thereof. In general, the invention is only intended to be limited by the scope of the following claims.

The invention claimed is:

1. An exoskeleton comprising:
a torso brace configured to be coupled to a torso of a user;
a first leg support configured to be coupled to a first leg of the user;
a first plurality of links coupling the torso brace to the first leg support, the first plurality of links including:
 a first link coupled to the torso brace at a first pivot point; and
 a second link coupled to the first leg support at a second pivot point, wherein the first link is coupled to the second link through a third pivot point located between the first and second pivot points, and wherein the first pivot point enables adduction of the first leg support and the third pivot point enables abduction of the first leg support;
a second leg support configured to be coupled to a second leg of the user;
a second plurality of links coupling the torso brace to the second leg support, the second plurality of links including a third link coupled to the torso brace at a fourth pivot point which is distinct and spaced from the first pivot point.

2. The exoskeleton of claim 1, further comprising a load coupled to the exoskeleton, wherein the exoskeleton is configured to transfer at least a portion of the weight of the load from the torso brace, through the first plurality of links and to the first leg support.

3. The exoskeleton of claim 1, wherein an axis of rotation of the third pivot point is generally perpendicular to an axis of rotation of the second pivot point.

4. The exoskeleton of claim 3, wherein the axis of rotation of the third pivot point is generally perpendicular to a coronal plane of the exoskeleton.

5. The exoskeleton of claim 4, wherein an axis of rotation of the first pivot point is generally parallel to the axis of rotation of the third pivot point.

6. The exoskeleton of claim 1, wherein:
the second link is directly coupled to the first link at the third pivot point; or
the second link is directly coupled to a fourth link, of the first plurality of links, at the third pivot point.

7. The exoskeleton of claim 6, wherein the first and second links are directly coupled to the fourth link.

8. The exoskeleton of claim 1, wherein the first and second links are configured to make physical contact during adduction of the first leg support, thereby limiting adduction of the first leg support.

9. The exoskeleton of claim 1, further comprising a strap coupled to the first link, wherein the strap is configured to limit movement of the first link relative to the torso brace.

10. The exoskeleton of claim 9, wherein the strap couples the first link to the third link.

11. A method of increasing the flexibility of a hip joint of an exoskeleton comprising a torso brace configured to be coupled to a torso of a user, a first leg support configured to be coupled to a first leg of the user, a first plurality of links coupling the torso brace to the first leg support, a second leg support configured to be coupled to a second leg of the user and a second plurality of links coupling the torso brace to the second leg support, the method comprising:
configuring the first plurality of links to include a first link coupled to the torso brace at a first pivot point and a second link coupled to the first leg support at a second pivot point, the first link being coupled to the second link through a third pivot point located between the first and second pivot points;
configuring the second plurality of links to include a third link coupled to the torso brace at a fourth pivot point which is distinct and spaced from the first pivot point;
enabling adduction of the first leg support via the first pivot point; and
enabling abduction of the first leg support via the third pivot point.

12. The method of claim 11, wherein configuring the first plurality of links includes configuring the first plurality of links to transfer at least a portion of the weight of a load from the torso brace to the first leg support.

13. The method of claim 11, wherein configuring the first plurality of links includes aligning an axis of rotation of the third pivot point:
generally perpendicular to an axis of rotation of the second pivot point; and
generally perpendicular to a coronal plane of the exoskeleton.

14. The method of claim 11, wherein configuring the first plurality of links includes:
directly coupling the second link to the first link at the third pivot point; or
directly coupling the second link to a fourth link, of the first plurality of links, at the third pivot point.

15. The method of claim 11, further comprising:
limiting adduction of the first leg support by causing the first and second links to make physical contact during adduction of the first leg support; or
limiting movement of the first link relative to the torso brace by coupling a strap to the first link.

16. A method of walking in an exoskeleton comprising a torso brace configured to be coupled to a torso of a user, a first leg support configured to be coupled to a first leg of the user, a first plurality of links coupling the torso brace to the first leg support, a second leg support configured to be coupled to a second leg of the user and a second plurality of links coupling the torso brace to the second leg support, the method comprising:
causing a first link, coupled to the torso brace at a first pivot point, to pivot about the first pivot point;
causing a second link, coupled to the first leg support at a second pivot point, to pivot about the second pivot point;
adducting the first leg support via the first pivot point;
abducting the first leg support via a third pivot point located between the first and second pivot points, wherein the first link is coupled to the second link through the third pivot point; and
causing a third link, coupled to the torso brace at a fourth pivot point which is distinct and spaced from the first pivot point, to pivot about the fourth pivot point.

17. The method of claim 16, further comprising transferring at least a portion of the weight of a load from the torso brace, through the first plurality of links and to the first leg support.

18. The method of claim 16, wherein abducting the first leg support via the third pivot point includes:
- causing the first leg support to pivot about an axis of rotation generally perpendicular to an axis of rotation of the second pivot point; and
- causing the first leg support to pivot about an axis of rotation generally perpendicular to a coronal plane of the exoskeleton.

19. The method of claim 16, wherein:
- the second link is directly coupled to the first link at the third pivot point and abducting the first leg support via the third pivot point includes causing the second link to move relative to the first link; or
- the second link is directly coupled to a fourth link, of the first plurality of links, at the third pivot point and abducting the first leg support via the third pivot point includes causing the second link to move relative to the third link.

20. The method of claim 16, further comprising:
- causing the first and second links to make physical contact during adduction of the first leg support, thereby limiting adduction of the first leg support; and
- causing a strap to apply tension to the first link, thereby limiting movement of the first link relative to the torso brace.

* * * * *